July 21, 1925.  1,546,431
E. N. BRANDT
TOY VEHICLE
Filed Oct. 11, 1924  2 Sheets-Sheet 1
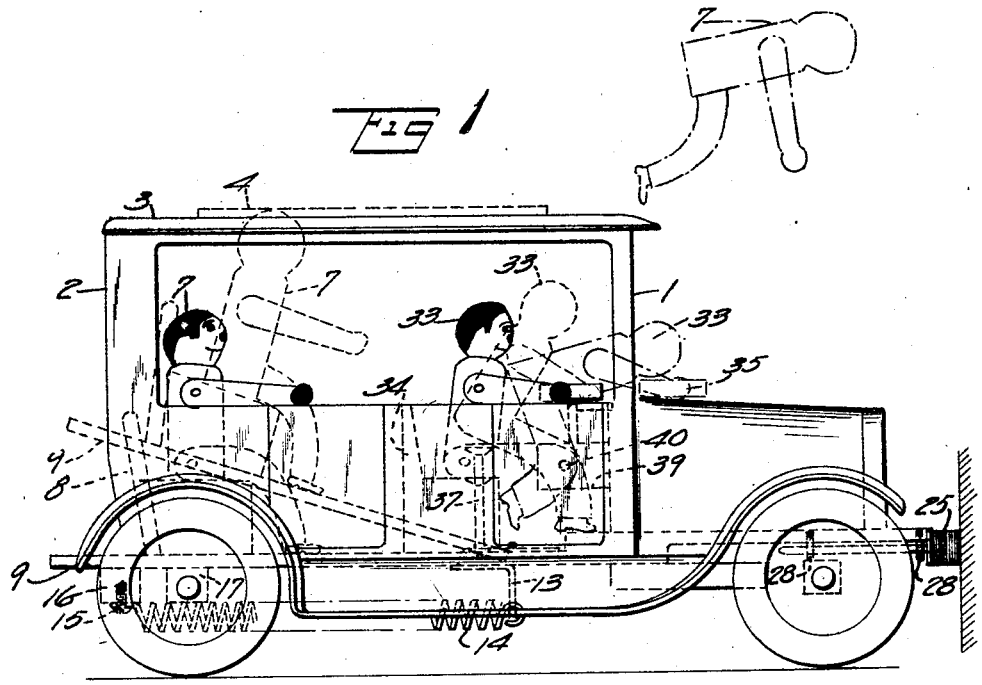
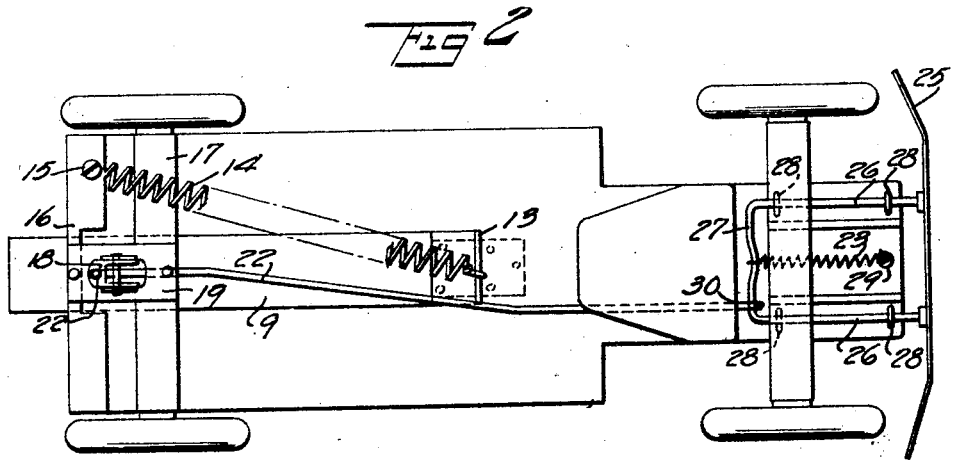
INVENTOR
Erdmann N. Brandt
BY Richard Eyre
ATTORNEY

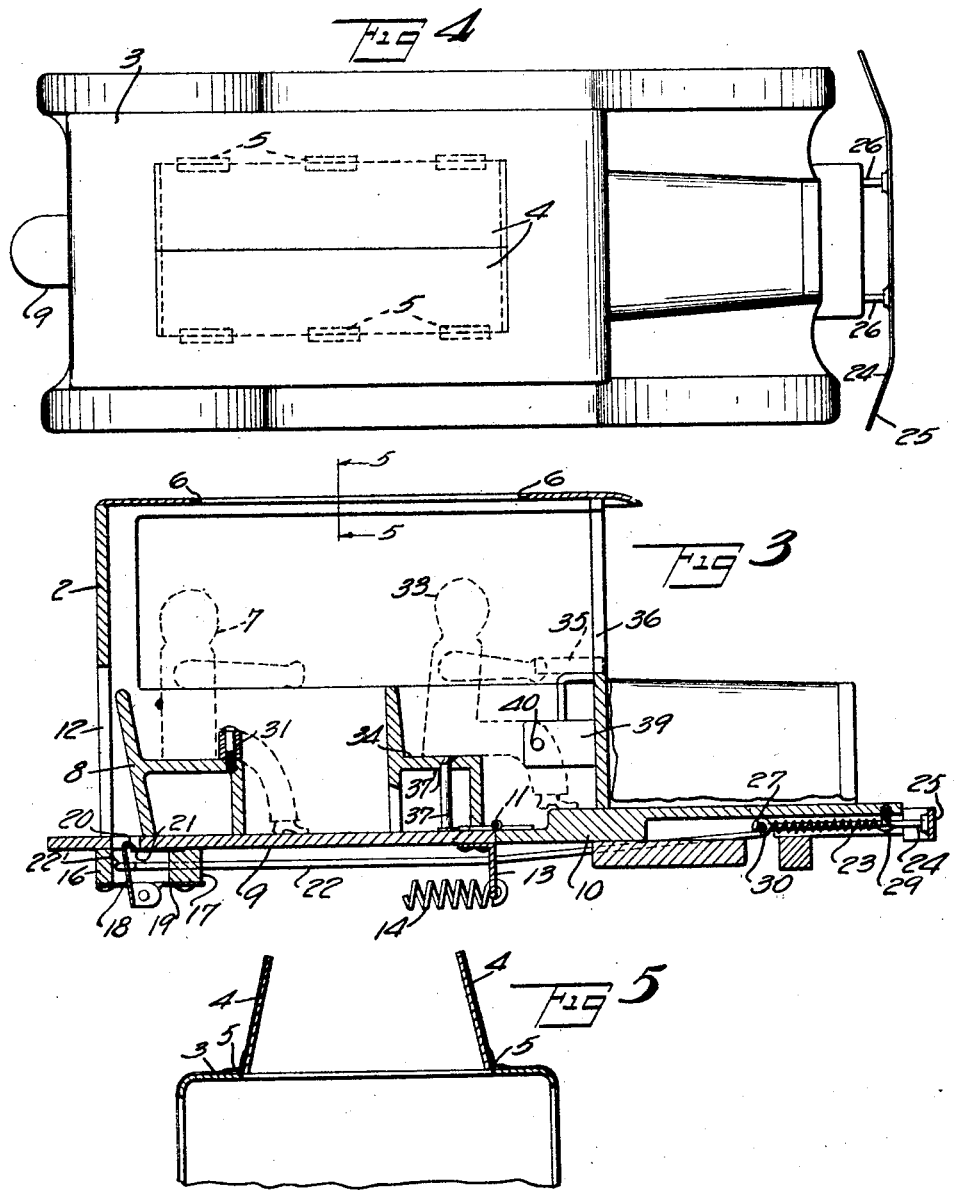

Patented July 21, 1925.

1,546,431

UNITED STATES PATENT OFFICE.

ERDMANN N. BRANDT, OF TARRYTOWN, NEW YORK, ASSIGNOR TO FERDINAND STRAUSS CORPORATION, A CORPORATION OF NEW YORK.

TOY VEHICLE.

Application filed October 11, 1924. Serial No. 743,068.

*To all whom it may concern:*

Be it known that I, ERDMANN N. BRANDT, a citizen of the United States, residing at and whose post-office address is Hillside Place, Tarrytown, New York, have invented a new Toy Vehicle, of which the following is a specification.

This invention relates to toy passenger conveyances and the object thereof is a novel and amusing device of this character.

The invention resides in a toy passenger conveyance, specifically of the automobile type, which is adapted to cause simulated passengers carried thereby to be thrown from the vehicle in an amusing and ludicrous manner, as for example by being violently somersaulted or catapulted head first therefrom. In the preferred embodiment the passenger is automatically somersaulted through the car roof when the vehicle meets an obstruction, and the mechanism, organization and timing are such as to assure exact duplications of the catapulting or somesaulting acts at each operation of the device. The invention further consists in causing a simulated chauffeur or other occupant to be thrown to a ludicrous position simultaneously with the somersaulting of the passenger. The invention also contemplates a novel correlated mechanism for effecting these objects and especially a mechanism of few and simple parts and capable of inexpensive and economical manufacture.

For a better understanding of the invention, reference may be had to the accompanying drawings forming a part of this application, wherein:

Fig. 1 is a side view of an automobile passenger vehicle embodying my invention.

Fig. 2 is a bottom view thereof.

Fig. 3 is a longitudinal sectional view therethrough.

Fig. 4 is a plan view thereof, and

Fig. 5 is a partial cross sectional view on the line 5—5 of Fig. 3.

Referring to the drawings I have illustrated my invention as embodied in a conveyance 1 of the automobile type having a conventionally illustrated top 2. The latter has a roof 3 also of conventional form, except that it is provided with a rectangular opening normally closed by a pair of closing doors or flaps 4. The doors 4 may be hinged to the sides of the opening in the roof 3 in any suitable manner, but are indicated as provided with flexible flaps 5 glued respectively to the roof 3 and the door lids or closures 4. The door closures 4 fall by gravity to the closed position upon the ledges 6, the doors opening upwardly. A simulated passenger is indicated at 7, the latter being carried by a rear seat 8. The seat 8 is carried by a rearwardly extending floor member 9 and the latter normally forms a continuation of the forwardly extending frame member 10, but is hinged thereto by a hinge member 11. The rearwardly extending floor member 9 is therefore capable of pivotal movement about the relatively fixed member 10 in an upward direction, an opening 12 in the rear of the body 2 permitting the rear end of the member 9 to play up and down therein. The member 9 carries at its forward end and on the under side thereof a downwardly projecting bracket member 13 and to the lower end of this bracket 13 is attached one end of a tension spring 14, the other end of this spring 14 being attached to some fixed portion of the vehicle, as for example to the rear cross piece 16 by means of a screw attachment 15. The spring 14 is normally under tension and by pulling on the bracket 13 tends to throw the rearward end of the member 9 to its uppermost position, indicated in dotted lines in Fig. 1. The member 9, however, together with its seat 8 and simulated passenger 7, is normally retained in its lowermost position by means of a holding and tripping mechanism comprising a trigger or catch member 18 pivotally carried by a plate 19 which in turn is carried by and bridges the axle 17 and the rear frame member 16. The retaining member 18 projects up through an opening provided in the plate 19 and on its free end is provided with a catch 20 cooperating with a stationary lug or lip 21 which is suitably fastened to the under side of the longitudinal member 9 and projects out into the opening provided therein for the reception of the catch 20 of the member 18. The member 18 is normally pulled forward with its catch 20 in a retaining position above the lug 21 by means of a mechanism including a forwardly extending rod 22, a reciprocable bumper frame 24 and a tension spring 23. The rod 22 is indicated as passing through the rear shaft 17 and provided with a hook 22' through which the pivoted retaining member 18 passes to provide a suitable operative connection therewith. The bumper frame 24 includes a conventionally illustrated bumper 25 which is rigidly fixed to and carried by the forwardly extending arms 26 which are joined together at their rear ends by a cross piece 27. The frame reciprocates back and forth through suitable supports such as carrying eye members 28 fixed to the under side of the body frame. The spring 23 is fixed at its forward end to the under side of the vehicle body frame in any suitable manner, as for example by the screw attachment 29 and it extends rearwardly with its rear end fastened to the cross piece or rod 27, carried by the longitudinal frame members 26. The rod 22 is attached at its forward end to the cross piece 27 in any suitable manner, as for example with a hooked end 30 passing therearound, similarly to the attachment with the retaining member 18. The spring 23 is normally under tension and therefore pulls forwardly on the bumper frame and the rod 22 to hold the retaining and tripping member 18 in its foremost position. A lug or upwardly extending projection 31 is carried by the forward part of the seat 8 and fixed thereto in any suitable manner, as for example by the screw attachment indicated. The purpose of this is to enable the proper positioning of the passenger 7 upon the seat, namely with his legs straddling this projection, so as to center the passenger upon the seat and also to prevent his slipping forward thereon when the vehicle comes to a sudden stop.

The operation of the mechanism described is as follows: In Fig. 3 and in the full line position indicated in Fig. 1 the retaining or latch member 18 engages the lug or lip 21 to hold the floor member 9 in its lowermost position. By tripping this latch, however, as for example, by means of the bumper 25 meeting an obstruction and thereby transmitting movement through the rod 22 to the member 18 to disengage it, the pivoted member 9 is thrown abruptly to the dotted position shown in Fig. 1 by means of the spring 14 which is under tension for this purpose. The abrupt and violent movement of the pivoted seat carrier member 9 to its uppermost position and there suddenly arrested, results in the catapulting or somersaulting of the passenger 7 through the opening provided in the roof of the car, the door flaps 4 opening as the passenger passes through and automatically closing again by gravity after the passenger has passed therethrough in the forward somersaulting movement. The dot-dash position indicates a forward position of the passenger after passing through the opening and beyond the doors 4. The construction and arrangement is preferably such that the doors 4 are engaged by the passenger 7 and begin their opening movement before the member 9 reaches its uppermost position and before the passenger 7 leaves the seat 8. A positive initial opening movement of the doors 4 is thus effected by the direct transmission of opening force from the spring 14 through the floor member 9, the seat 8 and the passenger 7. This assures the exact duplication of the somersaulting acts at each operation thereof, the passenger 7 being thrown head foremost through the doors which close after such passenger or passengers have passed therethrough and been somersaulted over the front end of the vehicle. The dotted position in Fig. 1 indicates this preferred construction and mode of operation whereby the initial opening movement of the doors is effected through the direct transmission of power from the spring 14 without necessitating any reliance on the momentum of the passenger 7 alone to effect this initial opening movement.

I have also correlated with the structure and mechanism above described a mechanism for throwing a simulated chauffeur or pilot 33 to a ludicrous position, simultaneously with the catapulting or somersaulting of the passenger 7 through the top of the roof. Normally the simulated chauffeur 33 rests in the driver's seat 34 and is indicated as gripping a control mechanism 35. In the particular embodiment shown the chauffeur 33 is caused to be hurled head foremost through the windshield 36 of the car with his head and control part 35 resting upon the hood of the car. This is effected through the medium of a plunger 37 passing through the seat 34 with its upper end underneath the chauffeur 33 and with its lower end resting upon the pivoted floor member 9. The plunger 37 may, if desired, be provided with the beveled head 37 resting in a counter-sunk seat about the opening passing through the seat 34, and on its lower end it may carry a suitable retaining device such as a pin for preventing it from passing out through the seat 34 when the mechanism is tripped. By means of this correlated mechanism the chauffeur 33 is thrown forwardly through the windshield simultaneously with the throwing of the passenger 7 forwardly through the roof of the car. If desired the occupants of the car, such as the chauffeur 33, may be attached to the car in a manner to prevent the loss thereof, as for example by pivotally connecting the chauffeur 33 to a fixed portion or bracket 39 projecting backwardly from the windshield frame, the fixed bracket portion 39 being straddled by the chauffeur and pivotally connected thereto as indicated at 40.

I have illustrated my invention as embodied in the conventional automobile passenger vehicle which may be driven in any suitable manner to cause the bumper 25 to engage with an obstruction and thereby trip the mechanism for causing the catapulting acts, the power driving means such for example as a spring motor mechanism being omitted from the drawings for convenience in illustration.

Having thus described my invention, what I claim and desire to protect by Letters Patent is:

1. In a toy vehicle, a passenger compartment, a top therefor having an opening therethrough, a support disposed within the compartment and adapted to support a simulated occupant in line with said opening, means for abruptly actuating a simulated occupant resting on said support in an upward direction to cause it to be abruptly ejected through the opening in the top and from the compartment, a retaining device normally maintaining the actuating means in the inactive position and a device operable from an obstruction disposed in the path of the vehicle for releasing the same to cause the simulated occupant to be abruptly ejected from the compartment and through the opening upon the vehicle encountering the obstruction.

2. A toy vehicle of the character set forth in claim 1 wherein the ejecting mechanism is such to cause the simulated occupant to be thrown head-first through the opening in the top and over the front end of the vehicle.

3. A toy vehicle comprising a passenger compartment, a top or roof for said compartment, said top having an opening therethrough which a closing flap opening in an upward direction, a movable support for an occupant disposed within the compartment, an actuating motor device for abruptly actuating said support in an upward direction, and controlling means operable by an obstruction in the path of the vehicle to cause said motor actuating device to abruptly catapult a simulated occupant through said opening in the roof and over the front end of the vehicle.

4. A toy vehicle comprising a passenger compartment, a roof for said compartment, a movable support for a simulated occupant disposed within the compartment, a spring motor means engaging said support and normally urging it in an upward direction, a retaining device normally holding said support in the inactive position against the force of said spring motor means, and a longitudinally reciprocable bumper for releasing said retaining device and permitting the spring motor to abruptly actuate the support and abruptly eject a simulated occupant in an upward direction against said roof.

5. A toy vehicle comprising a passenger compartment, a roof for said compartment having an opening therein, a closing flap for said opening opening in an upward direction, a movable support for a simulated occupant disposed within the compartment, a spring motor means engaging said support and normally tending to actuate said support and a simulated occupant carried thereby to a position to engage and positively initiate the opening movement of said flap before the support is arrested in its upward movement, and controlling means for setting said spring motor means into operation to violently catapult the simulated occupant through the open door of the roof.

6. A toy vehicle of the character set forth in claim 5 wherein a reciprocable bumper mechanism is provided for releasing the movable support and permitting the spring motor to abruptly actuate said support in an upward direction.

7. A toy vehicle of the character set forth in claim 5 wherein the means for controlling the spring motor and permitting it to abruptly actuate the occupant's support comprises a device operable by coming into contact with an obstruction disposed in the path of the vehicle.

8. A toy vehicle comprising a passenger compartment, an occupant's seat therein carried by a pivoted movable member, a spring motor means engaging said support and tending to actuate it to a position against a stop, a retaining device normally holding the seat support in its inactive position against the tension of the spring motor, a longitudinally reciprocable bumper frame normally biased to its foremost position and having an operative connection with said retaining device for releasing it when moved against the tension of the spring and permitting the spring motor to abruptly throw the movable seat and its pivoted carrying member to its position against said stop.

9. A toy vehicle of the character set forth in claim 8 wherein the passenger compartment is provided with a roof having an opening and a closing flap therefor, the arrangement being such that the closing flap is engaged by a simulated occupant carried by the movable seat before the movable seat support reaches its stopped position.

10. A toy vehicle of the character set forth in claim 8 wherein the movable seat is provided with retaining means to prevent the slipping or dislocation of the simulated passenger therefrom.

11. A toy vehicle comprising a windshield frame and an adjacent occupant's compartment, a simulated occupant carried in said compartment, an actuating device adapted to engage said simulated occupant and throw the same headlong through the vehicle windshield frame, and means for normally retaining the actuating device in an inactive position, but capable of ready release for permitting the actuating device to abruptly eject the simulated occupant headlong through the windshield frame.

12. A toy vehicle comprising a driver's compartment and a windshield frame, a simulated occupant normally carried in said compartment, power means for ejecting said simulated occupant abruptly through the windshield frame, a retaining device normally holding said power means in an inactive position and a bumper mechanism actuated by engagement with an obstruction in the path of the vehicle for releasing the retaining device and permitting the power means to abruptly throw the simulated occupant head-first through the windshield frame.

13. A toy vehicle of the character set forth in claim 14 wherein a second simulated occupant carried by the vehicle is ejected or catapulted from the vehicle simultaneously with the abrupt ejection of the other occupant through the windshield.

14. A toy vehicle of the character set forth in claim 4 wherein the opening in the top is normally closed with a pair of double flaps which are engaged along their meeting edges and opened by the simulated occupant upon ejection from the vehicle.

In testimony whereof, I have signed my name to this specification.

ERDMANN N. BRANDT.